United States Patent [19]

Berninger

[11] 3,890,506

[45] June 17, 1975

[54] FAST RESPONSE TIME IMAGE TUBE CAMERA

[75] Inventor: Walter H. Berninger, Schenectady, N.Y.

[73] Assignee: General Electric Company, Schenectady, N.Y.

[22] Filed: Nov. 15, 1973

[21] Appl. No.: 416,222

[52] U.S. Cl.......... 250/370; 250/213 VT; 250/363; 250/369
[51] Int. Cl. ............................................ G01t 1/00
[58] Field of Search .......... 250/370, 363, 362, 368, 250/369, 358, 393, 460, 211 J, 213 VT, 207

[56] References Cited
UNITED STATES PATENTS

| | | | |
|---|---|---|---|
| 3,207,902 | 9/1965 | Sandborg | 250/211 J |
| 3,676,676 | 7/1972 | Somer | 250/207 |
| 3,683,185 | 8/1972 | Muehllehner | 250/213 VT |
| 3,798,453 | 3/1974 | McIlwain | 250/213 VT |
| 3,805,058 | 4/1974 | Glaenzer | 250/203 |

*Primary Examiner*—Harold A. Dixon
*Attorney, Agent, or Firm*—Jack E. Haken; Joseph T. Cohen; Jerome C. Squillaro

[57] ABSTRACT

A semiconductor dual-axis positon sensor is connected inside, and at the output end, of a sealed, evacuated housing which contains a photocathode film at the input end thereof in optical communication with a phosphor layer. Pulses of light produced in the phosphor layer in response to incident nuclear particles or rays of electromagnetic radiation are converted to electrons in the photocathode film which are accelerated and focussed onto the semiconductor sensor to produce electrical signals from which the $x$ and $y$ coordinates and energy of the incident rays or particles are determined.

14 Claims, 5 Drawing Figures

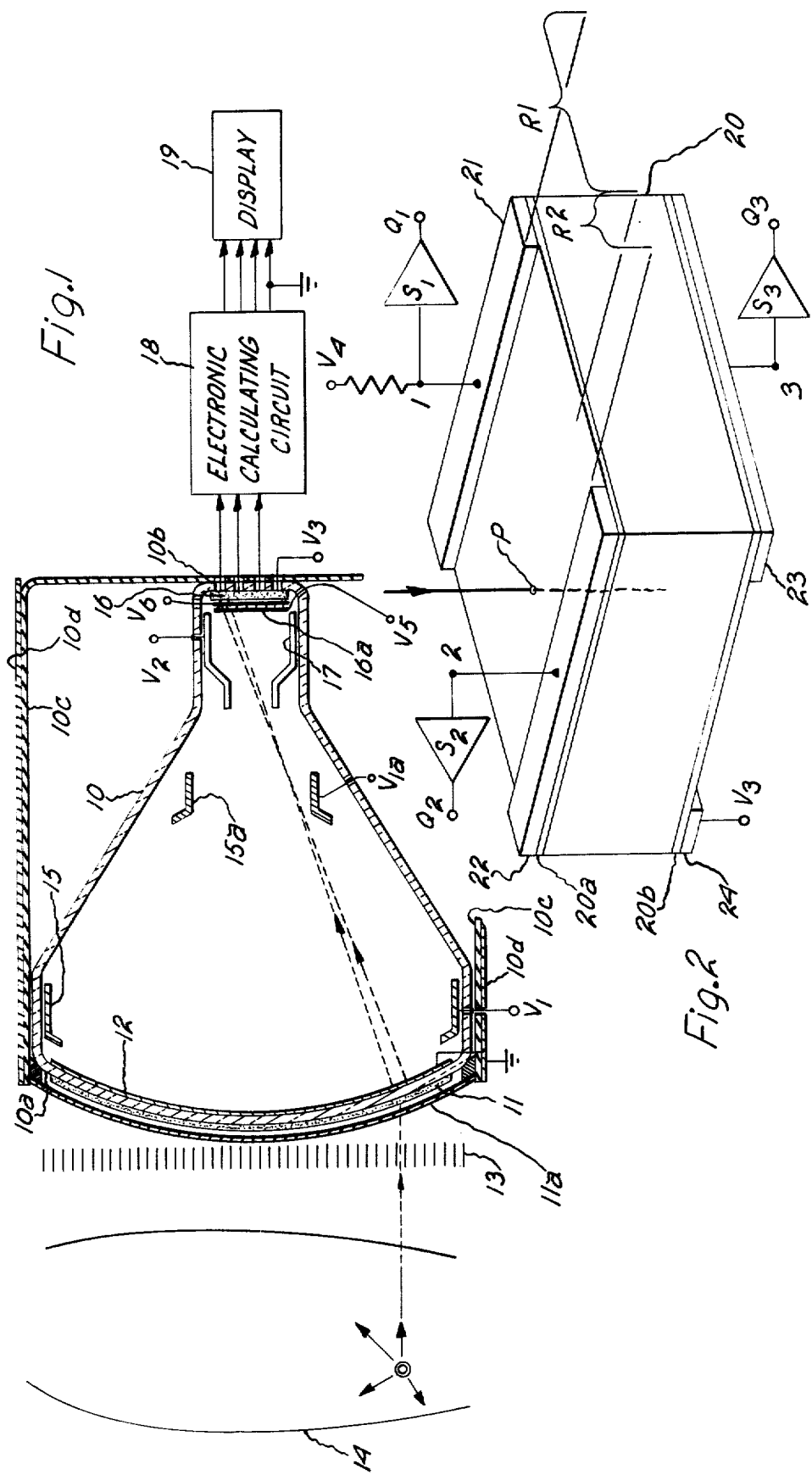

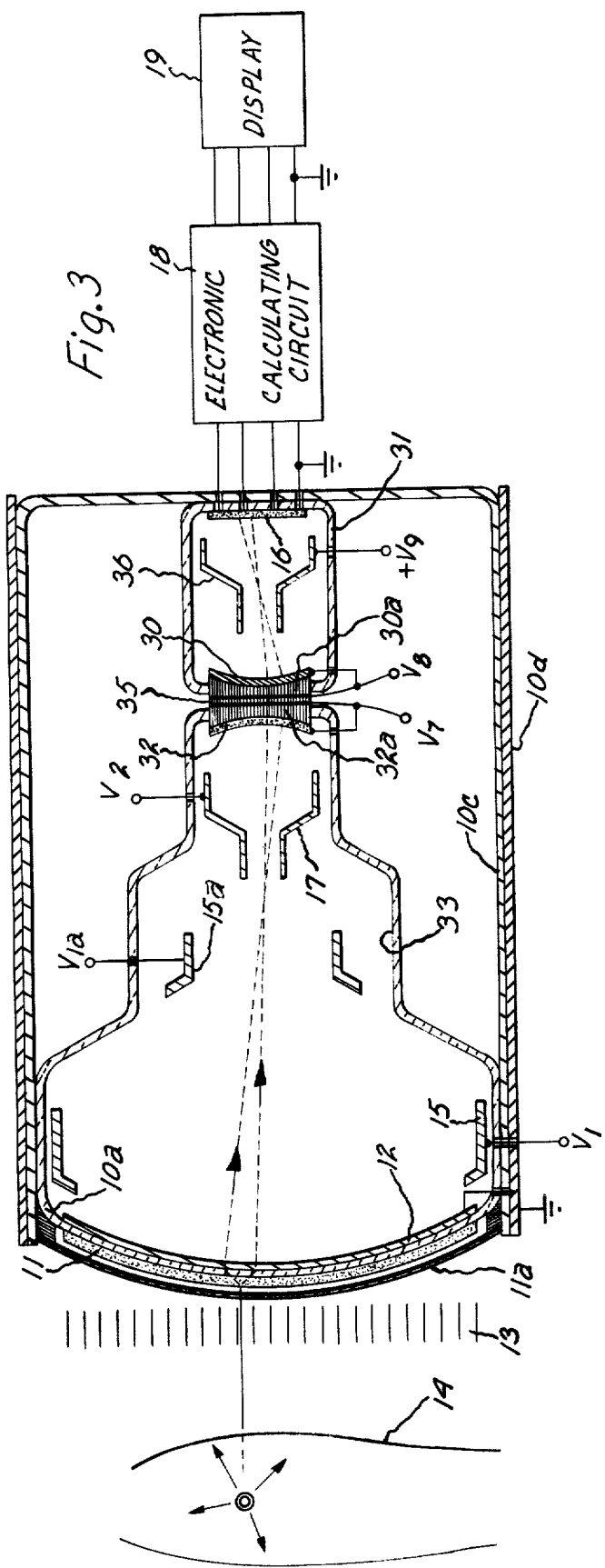
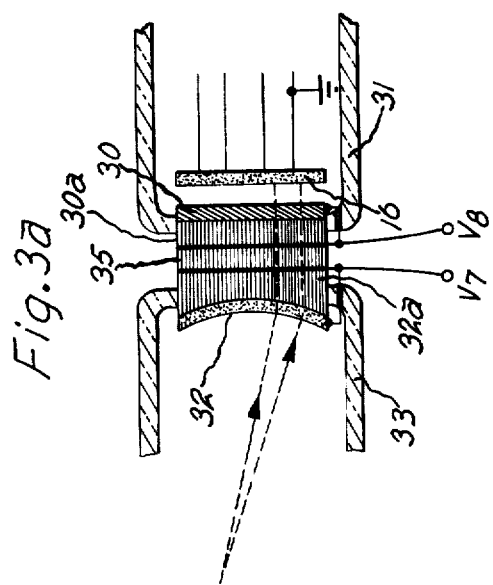

FAST RESPONSE TIME IMAGE TUBE CAMERA

My invention relates to a stationary apparatus that does not require scanning to produce an image of a distribution of sources of nuclear particles or rays of electromagnetic radiation and, in particular, to a gamma camera apparatus of the image intensifier type wherein the position sensor which determines the dual-axis coordinates and energy of the incident rays or particles is located within the sealed glass envelope.

Nuclear medicine is one of the most rapidly growing fields of medical diagnosis at the present time. The most general application of nuclear medicine in medical diagnosis involves administering to the patient, by injection, swallowing, or breathing, a small dose of a radiopharmaceutical, i.e., a short-lived gamma-ray-emitting isotope (such as Technetium-99m) which has been formed into an appropriate chemical compound so that the isotope either is attracted to, or avoids, a particular organ or region of the patient's body. A noninvasive instrument is used for monitoring the isotope distributing by means of the gamma ray emission and provides the physician with valuable diagnostic information.

The monitoring of the gamma ray emission is most frequently now accomplished with an instrument known as the gamma camera and, in particular, with a scintillation camera described in U.S. Pat. No. 3,011,057 to Anger. In the Anger patented camera, which is a gamma camera of the photomultiplier type, a scintillation is detected by a closely packed array of 19 photomultipliers, located adjacent to, but spaced from a scintillator, whose outputs are processed to determine the incident gamma ray position and energy. Other types of scintillation cameras have been developed, but none of them have thus far achieved the prominence of the Anger patented camera because of one or more limitations inherent in the present form of such devices. A more recent approach for gamma ray imaging has been an image intensifiertype of scintillation camera as described in U.S. Pat. No. 3,683,185 to Muehllehner in which a three-stage image intensifier is utilized and the output phosphor thereof is optically coupled through a fiber optic plate to an externally positioned light-photon sensitive position sensor device. This latter gamma camera is related to my gamma camera to be described hereinafter in that both inventions utilize a semiconductor dual-axis position sensor device. However, the external location of the position sensor in the Muehllehner apparatus and the low energy light-photon excitation thereof results in relatively poor image quality due to the cumulative effect of the required stages of amplification (image intensification). Further, each phosphor conversion step reduces the count rate capability since it introduces further phosphor delay times and therefore substantially decreases the response time of the Muehllehner system. The Muehllehner apparatus is also physically cumbersome due to the many required amplification stages.

Finally, image intensifier gamma cameras employing a photographic read-out have been developed, but were not successful commercially due to their poor spatial resolution.

Therefore, one of the principal objects of my invention is to provide an improved gamma camera of the image intensifier type which provides image quality relative to that obtained with the conventional gamma cameras.

Another object of my invention is to provide the gamma camera with a faster response time than that obtained with conventional gamma cameras.

A further object of my invention is to provide my gamma camera with a position sensor internal of the sealed glass envelope.

A still further object of my invention is to provide the gamma camera with high energy pulsed electron excitation of the position sensor.

Another object of my invention is to provide the gamma camera with fewer stages of amplification than that required with conventional image intensifier gamma cameras.

A further object of my invention is to provide a gamma camera with a minimal number of components in order to improve reliability and to reduce the frequency of alignment necessary, for example, in a conventional photomultiplier type gamma camera.

Another object of my invention is to provide better spatial resolution than image intensifier gamma cameras employing photographic readouts, through the centroid detecting properties of the position sensitive detector.

Although the image-tube camera apparatus will be described hereinafter as a gamma camera, it should be understood that it is also capable of use with other type electromagnetic radiation such as X-rays, as well a' with nuclear particles such as positrons. That is, my image-tube camera can be used to detect the distribution of any radiation or particle to which the scintillator is responsive.

Therefore, another object of my invention is to provide an improved image intensifier type of scintillation camera for imaging the distribution of incident nuclear particles or rays of electromagnetic radiation.

Briefly summarized, my invention is an improved, fast response time, image-tube camera apparatus which includes a sealed housing having a first phosphor layer and first photocathode film at the input end thereof and a semiconductor dual-axis position sensor located within the housing at the output end. Suitable accelerating and focussing electrodes are positioned between the photocathode film and semiconductor position sensor for accelerating the electrons emitted from the photocathode film in response to nuclear particles or rays of electromagnetic radiation which are incident on the phosphor layer and absorbed therein. The accelerated electrons are focussed on the semiconductor position sensor and cause high energy pulsed electron excitation thereof so as to provide a substantial quantum gain over the conventional low energy light-photon excitation of such sensor. This quantum gain avoids the need for utilizing several amplification (image intensification) stages and thus obtains both improved image quality and faster response time compared to the conventional image-tube gamma camera. The semiconductor position sensor produces electrical signals in response to the high energy pulsed electron excitation thereof from which the $x$ and $y$ coordinates and energy of the incident rays or particles are determined in electronic circuitry located external of the housing. A suitable read-out device is connected to the output of the electronic circuit for recording the $x$ and $y$ coordinates of the incident rays or particles and the energy thereof.

In applications wherein a higher gain is required, an additional stage of amplification is utilized.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same reference character and wherein:

FIG. 1 is a view, partly in block diagram form, of a single-stage embodiment of my invention;

FIG. 2 is an enlarged perspective view of the semiconductor dual-axis position sensor utilized in my invention;

FIG. 3 is a view of a dual-stage embodiment of my invention;

FIG. 3a illustrates a proximity focussed output stage of my invention; and

Figure 4:
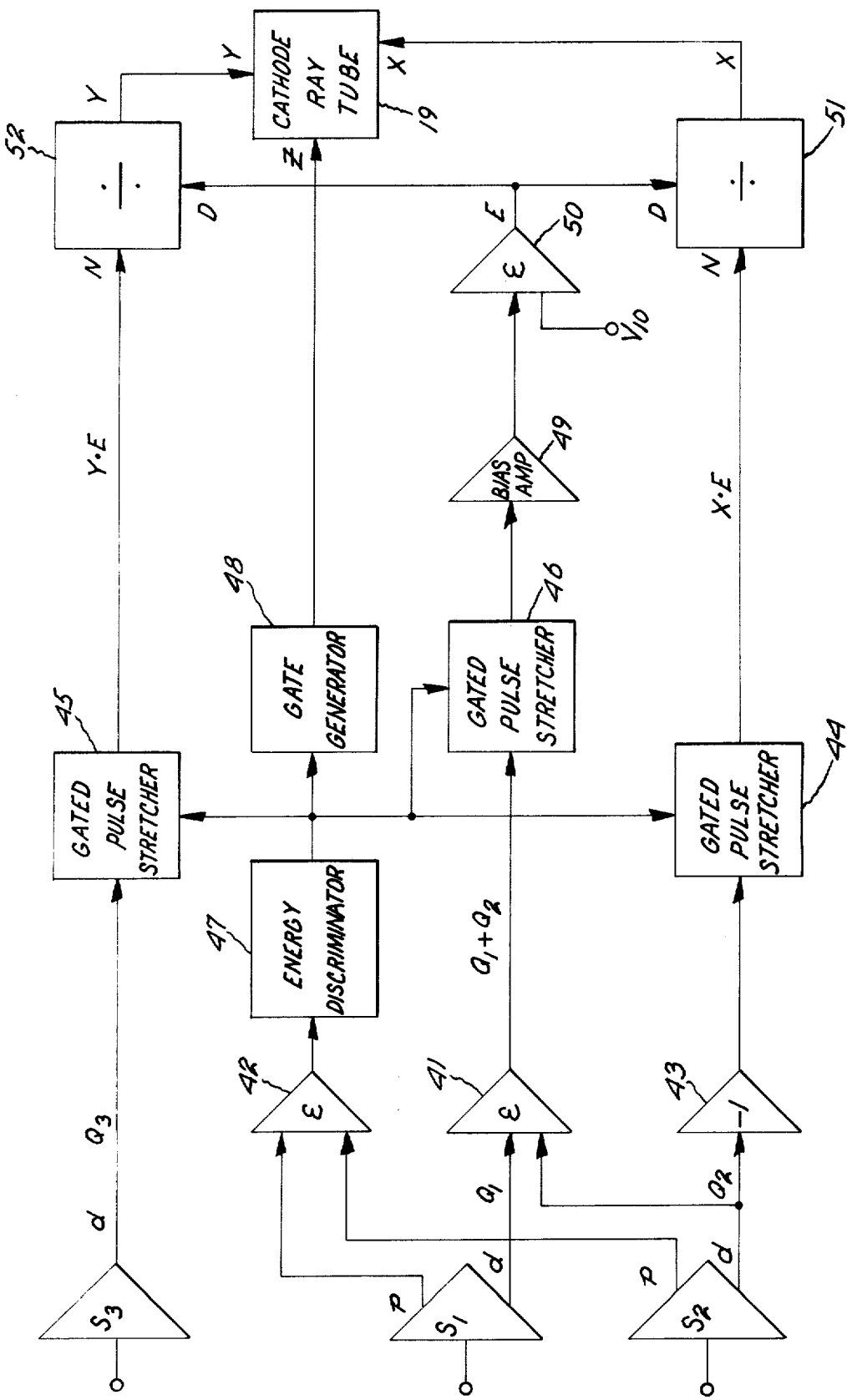
FIG. 4 is a block diagram of the electronic calculating circuit utilized in my invention.

Referring now in particular to FIG. 1, there is shown a first embodiment of my invention wherein a sealed, evacuated inner housing 10 may conveniently be in the form of a glass envelope having a large diameter input end 10a and a small diameter output end 10b. The side and output end of housing 10 are suitably surrounded by a magnetic shield 10c which may typically be formed of Mumetal. A concentric outer housing 10d, which need not be sealed and may be formed of aluminum, provides for the support of shield 10c and inner housing 10, and is preferably at ground potential. The input end 10a is typically 12 inches in diameter, but can be larger or somewhat smaller, as desired. The output end is typically about 1 inch in diameter for a 20 × 20 mm position sensor. The input end of housing 10 will hereinafter be described as a glass input window 10a, whereas the output end will be described as a back plate 10b that may be formed of glass or other nonelectrically conductive material (that need not be light-transparent). Input window 10a is curved as in the case of the conventional image intensifier tube and a single crystal phosphor layer 11 is placed along the entire surface of input window 10a, and preferably along the outer (convex) surface thereof. This phosphor layer 11 is of uniform thickness, in the order of one-half inch, and is formed of a material which will scintillate in response to the particular radiation or particle being monitored. This input phosphor layer is generally known in nuclear medicine technology as a scintillation crystal, or scintillator, and may typically be thallium-activated sodium iodide, NaI(Tl), CsT(Tl), or CsI(Na) for gamma ray monitoring. A suitable thin aluminum shield 11a (in the order of 1/32 inch thick) is slightly spaced from scintillator 11 and sealed along the outer edge of the input window to provide a means for isolating the scintillator from the ambient. The sealed space between scintillator 11 and shield 11a is typically backfilled with one atmosphere of dry nitrogen. Alternatively, the scintillator 11 may be placed on the inner (concave) surface of input window 10a. However, this is not the preferred arrangement since additional isolating means may be required between the scintillator and a photocathode film 12, and this is difficult to accomplish at a one-half inch thickness. As illustrated in FIG. 1, photocathode film 12 is preferably desposited along the inner surface of the input window. The photocathode film 12 is of uniform thickness of approximately 100 Angstrom and is formed of a material having a high quantum efficiency at the wavelength of scintillation of scintillator 11. Photocathode film 12 may typically be a mixture of potassium, cesium and antimony for the common scintillators. A suitable gamma radiation collimator 13 (typically a 1-inch thick lead sheet with a large number of small equal size, equally spaced holes therethrough) is generally utilized and interposed between scintillator 11 and the particular organ or other region of the body of a patient 14 being imaged. Alternatively, the recently developed coded imaging aperture system may be utilized instead of a gamma ray collimator. Approximately 500 photoelectrons are emitted from photocathode 12 for each 140 keV energy gamma ray absorbed in scintillator 11.

Photoelectrons emitted by the photocathode film 12 are focussed by a suitable electrode 15 positioned along the inner surface of the glass envelope in close proximity to the input end thereof. Electrode 15 is connected to the proper voltage divider point of a suitable d.c. voltage source and is maintained at a potential $V_1$ of several hundred volts d.c. positive with respect to ground. The electrons beyond the point of crossover of their paths (indicated by dashed lines) are focussed onto a semiconductor dual-axis position sensor 16 connected along or adjacent the inner surface of the back plate 10b. The electrons emitted by photocathode film 12 (which is preferably operated at ground potential) are accelerated to approximately 30 kilovolts (or within the range of 25–40 kV) by means of electrode 17 being connected to the proper voltage divider point (positive potential $V_2$) of the d.c. voltage source. Accelerating electrode 17 is positioned within housing 10 in close proximity to the position sensitive detector 16 and beyond the crossover point of the electron paths.

Position sensor 16, shown in detail in FIG. 2, has four electrical conductors connected to the output thereof, and which are brought out through the back plate 10b. Three of the conductors are connected to an externally located electronic calculating circuit 18 and the fourth conductor is connected to the d.c. voltage source at the highest voltage point (positive potential $V_3$) utilized in my apparatus. In this embodiment, without a channel plate (16a), the voltage $V_3$ would generally be the same as $V_2$. Electronic circuit 18, illustrated in FIG. 4, determines the $x$ and $y$ coordinates and energy of the electrons impacting on the position sensor 16, which in turn corresponds to the $x$ and $y$ coordinates and energy of the incident gamma ray. The output of electronic circuit 18 is connected to a suitable read-out device 19 which may be a conventional cathode ray tube, as a typical example. Alternatively, the read-out means 19 may be a magnetic tape or other suitable digital recording device or medium for storing the information of the $x$ and $y$ coordinates and energy of the incident gamma ray for later read-out on photographic film or a cathode ray tube.

The operation of my single-stage gamma camera illustrated in FIG. 1 is as follows: The gamma rays which are emitted from the particular organ or region of the body of the patient being examined are incident on collimator 13, and the collimated gamma rays are absorbed in the scintillator material 11. Each absorbed gamma ray event in the scintillator 11 converts into a pulse of light wherein the number of optical photons is proportional to the energy of the absorbed gamma ray. The optical photons are thence detected by the photocathode film 12 which converts the light photons to photoelectrons. Since the number of electrons emitted from photocathode film 12 and impacting on position sensor 16 is proportional to the number of incident light photons, the number of electrons is thus also proportional to the energy of the absorbed incident gamma ray and my gamma camera has an energy resolving capability. The electrons emitted from photocathode film 12 are then accelerated in their paths of travel across evacuated envelope 10 and are focussed onto the position sensitive detector 16. The semiconductor position sensitive detector 16 is operated at the high potential $V_3$ and produces an electrical signal (having three components $Q_1, Q_2, Q_3$) which is processed in the electronic calculating circuit 18 to provide voltage signals representing the $x$ and $y$ coordinates and number of impacting electrons resulting from each incident gamma ray.

The position sensitive detector 16 is similar to the light-responsive devices disclosed in U.S. Pat. Nos. 3,354,313 and 3,369,124 and consists of a body 20 of high resistivity, lightly doped semiconductor material of a first conductivity type ("$n$" type silicon having a resistivity of 2000 ohm-cm will be assumed for exemplary purposes). Although the principle of operation of the light-responsive detectors and the present electron-responsive detector 16 is similar, each incident light photon produces only a single hole-electron pair in the semiconductor body whereas each incident electron produces many hole-electron pairs, the number depending on the electron energy. Thus, there is a significant difference in quantum efficiency between the two different type detectors and as noted hereinabove, the higher quantum efficiency of high energy electron-excitation of detector 16 avoids the need for utilizing several amplification stages which would degrade image quality and increase the response time. Structurally, the p-n junction is much more shallow in the electron-responsive detector due to the significant interaction of the incident electrons with any charge (in particular, with any electrons) in the material of the semiconductor body whereas the light photons penetrate further into the body and therefore the p-n junction is deeper therein. Body 20 may typically have a square cross-section (i.e., in the plane normal to the impacting electrons) and be of dimensions 20 × 20 mm × several thousandths of an inch thickness. The opposing surfaces of body 20 are flat and parallel. A uniformly thin layer 20a in the top portion of body 20, that is, at the surface upon which the incident electrons impact, includes a dopant material to produce a heavily doped, uniformly thin layer of a second conductivity type opposite that of the first type (i.e., for $n$ type silicon, layer 20a is $p$ type). The depth of the shallow p-n junction formed by layer 20a chosen to be smaller than the impacting electrons range. Layer 20a forms a first contact layer which is assumed to be essentially transparent to the impacting electrons and to exhibit a uniform sheet resistance in the order of 30,000 ohms per square. In like manner, a uniformly thin layer 20b in the bottom portion of body 20, that is, at the opposite surface from layer 20a, includes a dopant material to produce a heavily doped, uniformly thin layer of the first conductivity type which becomes a second contact layer also having a uniformly high sheet resistance of the same order of magnitude as the first contact layer. Four terminal strips of low resistivity are connected to, or formed on, the contact layers as illustrated, the first two strips 21, 22 being in parallel relationship along the top surface of contact layer 20a along two opposite edges thereof. In like manner, the other two terminal strips 23, 24 are in parallel relationship along the bottom surface of contact layer 20b along the two edges which are perpendicular to the first two edges. The position sensor device is reverse-biased (by having terminal strip 24 connected to the highest voltage point $V_3$ of the d.c. voltage source and terminal strip 21 connected through a resistor to a voltage point $V_4$ in order of 100 volts less positive than $V_3$) to produce a depletion region extending through most (or even all) of the n region in body 20 as determined by the magnitude of the bias voltage. It is recognized that the capacitance of the sensor decreases with increasing depletion of the body of semiconductor material, thereby obtaining a faster response sensor, with the depletion level being limited by the leakage current. It is further recognized that response time increases with increased contact layer resistance. However, position resolution decreases with decreased contact layer resistance. Hence, one must optimize the choice of device sheet resistance relative to the desired end use.

Assume that a packet of electrons impact on the top surface of the semiconductor position sensitive detector device illustrated in FIG. 2. Upon entering the semiconductor material (as shown by the arrowheads), the electrons lose their energy through the creation of hole-electron pairs in the depletion zone, creation occurring at the approximate rate of 3.6 eV/pair. The created hole-electron pairs move along the electric field produced by the reverse-bias voltage to the contact layers and appear at the contact surfaces approximately at the intersection of the electron trajectory line (shown by dashed line) and the contact surfaces. At each contact layer, the pulse of charge, Q, divides according to Ohm's law between terminals 1 (terminal strip 21) and 2 (terminal strip 22) in proportion to the effective sheet resistances $R_2$ and $R_1$ which are essentially proportional to the distance from the electrons impact point P to the position sensor terminals, i.e., $Q_1/Q_2=R_2/R_1$. This division presumes the connection of charge-sensitive amplifiers ($S_1$ and $S_2$ at terminals 1 and 2, respectively,) which exhibit virtual a.c. grounds for pulse purposes. Thus, the charge $Q_1$ or $Q_2$ appearing at either terminals 1 or 2 is proportional to one coordinate (assume the X-coordinate) of the impacting electrons with reference to the terminal strip edges of the position sensor. Also, the total charge $Q_1 + Q_2$ is proportional to the number of impact electrons which is proportional to the energy of the incident gamma ray. In like manner, charge division in the bottom contact layer 20b provides ($y-$) coordinate information for the orthogonal direction. Thus, since the total energy of the incident gamma ray is proportional to the sum of the outputs of charge-sensitive amplifiers $S_1$ and $S_2$, the x-coordinate thereof is proportional to ($Q_1$ or $Q_2/Q_1 + Q_2$) and the y-coordinate is proportional to ($Q_3/Q_1 + Q_2$) where $Q_3$ is the output of charge-sensitive amplifier $S_3$ having an input connected at terminal 3 (terminal strip 23). The dual-axis coordinates are obtained in view of the terminal strips being rotated 90° with respect to each other between the top and bottom of the position sensor. An alternate approach which determines the x and y coordinates of the impacting electrons from the center of the position sensor is an electronic calculating circuit which calculates the ratios $(Q_1-Q_2/Q_1+Q_2)$ and $(Q_3-Q_4/Q_3+Q_4)$ where $Q_4$ is the output of a charge-sensitive amplifier connected to terminal strip 24.

The semiconductor position sensor 16 has been fabricated by the following process: Beginning with 2000 ohm-centimeter n-type silicon as the basic semiconductor material, boron and phosphorous are respectively implanted through the top and bottom surface of the body of silicon material at an integrated dose of $1 \times 10^{14}/cm^2$ using a 50 kV accelerating voltage to form contact layers 20a and 20b, respectively. After the implant, a titanium-gold evaporation step is employed to form the terminal strips 21, 22, 23, 24 along the top and bottom surfaces and the complete device is subsequently annealed for 7 minutes at 400°C, which treatment yielded a surface sheet resistance on the order of 30,000 ohms per square. The reverse bias across semiconductor body 20 is typically in the range of −30 to −100 volts and results in the electric field being substantially vertical in the configuration of the device as illustrated in FIG. 2.

A quantum gain [position sensor output current/electron beam input current] of at least 8000 has been obtained in the dual-axis position sensor excited by 30 kV electrons. In the prior art gamma camera disclosed in the Muehllehner patent, the quantum gain is only about 150 and for that reason requires the many amplification stages and resultant poorer image quality, reduced count rate capability and slower response time.

An additional electrode 15a may be provided within envelope 10 and positioned between electrodes 15 and 17, and operated at a potential established by connecting such electrode to a voltage point $V_{1a}$ of the supply which is intermediate $V_1$ and $V_2$. Electrode 15a would function to provide variable magnification imaging (i.e., the image-tube would be zoomable) to thereby permit the imaging on the position sensor 16 of only a selected portion of the image appearing on scintillator 11.

Although the single-stage embodiment described hereinabove has sufficient gain for many applications, there are other applications wherein a higher gain may be desired in order to overcome an inherent noise level in the position sensor 16, that is, the apparatus must have a higher sensitivity due to a particularly low energy gamma ray emission from the subject patient. The higher gain may be achieved by positioning a conventional channel plate electron multiplier 16a (i.e., channel plate) within envelope 10 between photochathode 12 and position sensor 16 and closely spaced from the latter. Voltage $V_3$ applied to position sensor 16 can typically be 45 kV and the position sensor is normally operable within the range 40–50 kV. In the case of 45 kV operation of position sensor 16, the input electrode of channel plate 16a is connected to the point $V_5$ of the d.c. voltage source which is typically at 30 kV (the same as voltage $V_2$) and the output electrode is connected to point $V_6$ which is at 35 kV in order to maintain a potential of approximately 10 kV between channel plate 16a and sensor 6. It is desirable to operate the position sensor with electrons of the highest practical energy for two reasons. First, the quantum gain varies as electron energy/3.6eV. Second, practical position sensors have a thin (0.1 μm – 0.5 μm) dead region at their surface which is impenetrable to electrons of energy less than approximately 5 keV.

The gamma camera illustrated in FIG. 1 is a single image intensifier stage apparatus which is a relatively simple structure having a fast response time in the order of approximately 1 microsecond and has an image quality in the order of 200 × 200 picture elements for a 140 keV gamma ray and a 20 × 20 mm silicon position sensor. The 140 keV gamma ray produced approximately 500 photoelectrons which, when accelerated at 30 kV, yielded a 15 MeV pulse packet energy impinging on the position sensor. The silicon position sensor exhibited a position resolution of approximately ½% full scale, i.e., of sufficient resolution to produce the 200 × 200 element figure, when electron excited by the 15 MeV pulse. Since this was the result of preliminary work, an image quality of 400 × 400 picture elements can reasonably be expected upon refinement of the system. However, even the 200 × 200 image quality is better than present day commercial instruments by a factor of three. The favorable features of the fast response time and good image quality are obtained, as noted above, by the fact that the semiconductor position sensor is located within the image intensifier tube, rather than being located outside thereof, as has been done in the prior art, and thereby obtains significantly higher gain due to the high energy pulsed electron excitation of the position sensor as opposed to the low energy light-photon excitation in the prior art.

An alternative approach to obtain a higher gain apparatus is to utilize a two-stage image intensifier apparatus as depicted in FIG. 3. The second stage is obtained by fiber optical coupling between an output phosphor layer or scintillator 32 in the first stage image intensifier tube 33 and the photocathode film 30 of a small second image intensifier tube 31. The first stage output scintillator 32 is a uniform layer of a fast response phosphor for gamma camera applications, deposited on the concave input surface of a first fiber optic plate 32a having a flat output surface. Scintillator 32 may be zinc oxide, as a typical example. The second stage photocathode film 30 is a uniform thin film deposited on the concave output surface of a second fiber optic plate 30a having a flat input surface. Optic plates 32a and 30a are suitably sealed to open ends of tubes 33 and 31, respectively. Photocathode 30 may be of the same material as the first stage photocathode film 12. The thicknesses of layer 32 and film 30 are in the same order of thickness as layer 11 and film 12, respectively. A third fiber optic plate 35 may be utilized, and provides the optical coupling between the flat surfaces of fiber optic plates 32a and 30a. Plate 35, when employed, provides the capability for operating the position sensor 16 at ground potential, which feature is not obtainable in the single-stage embodiment when the photocathode film 12 is at ground potential. This feature is obtained by depositing thin (substantially lightphoton transparent) metal coatings on the input and output surfaces of fiber optic plate 35 in order to form electrodes. The input and output window electrodes of plate 35 are connected to voltage points $V_7$ and $V_8$ of the d.c. voltage source, respectively, and are electrically connected to output scintillator 32 and photocathode 30, respectively. Voltage $V_7$ may be in the order of +30 kV and $V_8$ in the order of −10 kV in order to obtain the proper potential between photocathode film 12 and the first stage output, and between the second stage input and the position sensor 16 at ground potential. Plate 35 must be of sufficient thickness to withstand the 40 kV potential applied thereacross without breakdown.

Both the input and output scintillators in the first stage, as well as the single scintillator in the single-stage embodiment, may be of the plate scintillator (integral layer) or mosaic scintillator type. The first and second stages are again shielded from the ambient by magnetic shield 10c and are supported within concentric outer housing 10d which again need not be sealed since each image intensifier tube 31 and 33 is separately evacuated and sealed. A common optical coupling grease is generally used between adjacent optical elements in order to eliminate air gaps therebetween. The input window 30a of the second stage is concave for improving the convergence and minimizing optical distortion of the signal. A second accelerating and focussing electrode 36 is utilized in the second stage image intensifier for accelerating the pulses of photoelectrons emitted from photocathode film 30 in response to incident gamma rays impacting on the scintillator 11 in the first stage and being converted to photoelectrons in the first photocathode film 12 and then reconverted to light photons in the second scintillator 32. The electrons emitted by photocathode film 30 are accelerated to a potential of approximately +10 kV (or within a range of 8–15 kV) relative to the output electrode of fiber optic plate 35 which is typically at −10kV by means of electrode 36 connected to point $V_9$ of the d.c. voltage source. Thus, voltage $V_9$ is in the range −2kV to +5kV for the above-designated film 30-to-electrode 36 potential range. The position sensor 16 is disposed within the second stage image intensifier tube at, or near, the output end thereof. Alternatively, the second focussing and accelerating electrode 36 may be omitted and the position sensor 16 positioned in very close proximity to the second photocathode film 30 which is now deposited on a flat surfaced output window of fiber optic plate 30a so that the electrons emitted therefrom are thereby proximity-focussed onto the position sensor, as illustrated in FIG. 3a. This latter approach thus avoids the cross-over of the electron paths in the second stage image intensifier, but does not increase the difficulty of manufacturing such image intensifier tube.

The higher gain associated with the two-stage image intensifier embodiment of my invention results in a slightly reduced image quality compared to my single-stage embodiment, but again is in the order of 200 × 200 picture elements for the same conditions stated with reference to the single-stage embodiment. Even though the image quality of the two-stage embodiment of my gamma camera is somewhat less than that obtained with a single-stage embodiment, the two-stage embodiment may be preferred since the manufacturing process is more amenable to depositing a photocathode film and connecting the position sensor in a small glass envelope, as opposed to accomplishing the same manufacturing steps within the large (single-stage) envelope.

Referring now to FIG. 4, there is shown an example of the electronic calculating circuit 18 that may be utilized for developing electrical signals which represent the position of the impacting electrons on the position sensor 16 with respect to the edges thereof, as well as the total number of the impacting electrons, which is proportional to the energy of an incident gamma ray. The charge-sensitive amplifiers $S_1, S_2$ and $S_3$ have their inputs connected to the terminal strips 21, 22 and 23, respectively, as indicated in FIG. 2. Each charge-sensitive amplifier is of the conventional type and includes both a preamplifier stage and an amplifier stage having a prompt output p and delayed output d. The delayed outputs of charge-sensitive amplifiers $S_1$ and $S_2$ are applied to inputs of a first conventional electronic summer 41 so that the output thereof is the sum $Q_1 + Q_2$, which is directly proportional to the number of the impacting electrons, which in turn is proportional to the energy of the incident gamma ray. The prompt outputs of charge-sensitive amplifiers $S_1$ and $S_2$ are applied to inputs of a second conventional electronic summer 42 and the output thereof is also directly proportional to the number of the impacting electrons. The delayed output of charge-sensitive amplifier $S_2$, which is $Q_2$, is also applied through an inverter 43 to a first input of a conventional first gated pulse stretcher or peak detector circuit 44. The delayed output of charge-sensitive amplifier $S_3$, which is $Q_3$, is applied to a first input of a second gated pulse stretcher or peak detector circuit 45. The output of summer 41 is applied to a first input of a third gated pulse stretcher or peak detector circuit 46. The output of summer 42 is applied to the input of a conventional single-channel analyzer, i.e., energy discriminator circuit 47 which is calibrated to respond only to a particular small energy band (range of number of impacting electrons) corresponding to the gamma rays of interest (i.e., analyzer 47 includes two discriminators, an upper level and a lower level discriminator). The output of single-channel analyzer is thus an "on/off" logic signal whose "on" state indicates that the number of impacting electrons is within the prescribed range corresponding to the gamma ray energy being monitored, and whose "off" state indicates that the electron number is outside the range (i.e., greater or less than the range of numbers determined by analyzer 47. The output of circuit 47 is applied to the second (i.e., the gate) inputs of the gated pulse stretcher circuits 44, 45, 46 and to the input of a conventional gate generator circuit 48 and gates on such gated circuits 44, 45, 46, 48 only during the intervals that the gamma rays lying in the energy range of interest are being detected by scintillator 11. Each of circuits 44, 45, 46 and 48 have internal timing circuits. Gate generator 48 generates pulses having a controlled delay and during such that they occur only during the peaks of the x and y coordinate signals. The gated (i.e., on/off) output of gate generator 48 is applied to the intensity (Z) input of a suitable read-out device which herein is indicated as a conventional cathode ray tube 19. The gated pulse stretcher or peak detector circuits 44, 45, 46 form substantially rectangular-shaped pulses in response to spikeshaped input pulses which result from the electron impact on the position sensor 16. The output of the gated pulse stretcher 44 represents the x-coordinate of the impacting electrons multiplied by the energy thereof (X·E). In like manner, the output of gated pulse stretcher 45 is the y-coordinate multiplied by the energy (Y·E). The output X·E of gated pulse stretcher 44 is supplied as a numerator N input to an analog pulse divider circuit 51. In like manner, the output Y·E of gated pulse stretcher 45 is applied to the numerator N input of divider 52. In order to obtain the x and y coordinate signals, the X·E and Y·E outputs of gated pulse stretchers 44 and 45 must be divided by a signal representing the energy E of the gamma rays (i.e., the number of the impacting electrons).

Since the analog pulse divider is frequently cited as being limited in both response time and accuracy, a brief description of the particular divider(s) employed herein will now follow. The dividers utilized herein are commercially available and operate with nominal 10 volt full scale input levels and produce an output of the form 10N/D volts where N and D are respectively the numerator and denominator input voltages. In order to avoid a divide-by-zero condition in the analog pulse dividers which would otherwise occur in the case that the output of gated pulse stretcher 46 were gated off and its output were directly applied to the pulse divider, the output of the pulse stretcher 46 is processed by a unity gain bias amplifier 49 whose output is in turn added (in summer 50) to a constant d.c. voltage $V_{10}$ equal to the bias offset of amplifier 49. Thus, when pulse stretcher 46 is gated off and its output voltage is zero, the denominator input signal D to the dividers is a constant d.c. signal equal to $V_{10}$, obtained at the output of summer 50.

In this condition, the pulse dividers are maintained in a non-overload condition.

At such time that the energy analyzer 47 gates pulse stretcher 46 on, the output of component 46 is a rectangular shaped pulse whose amplitude is proportional to the gamma ray energy E. When the system is in this gated-on state, the offsets of components 49 and 50 exactly cancel and, for the duration of the signal from pulse stretcher 46, the amplitude of the denominator input to the analog pulse dividers is equal to the amplitude of the output of unit 46 (i.e., proportional to gamma ray energy). Thus, in the gated-on condition, $D = E$. The analog pulse divider used in an initial embodiment of my invention made use of an Analog Devices, Inc. Model 429 B high speed, high accuracy divider module. Using ths module, my system could achieve 1 μsec division times with 1% precision. The output of divider 51 represents the x-coordinate of the impacting electrons (and incident gamma ray) and is connected to the X input of the display device 19. In like manner, the output of divider 52 is connected to the Y input. The x and y coordinate signals are made visible on the cathode ray tube 19 since the intensity (Z) input signal is gated on at the peaks of the x and y coordinate signals to thereby generate luminous spots on the tube 19 screen. Pulse division times of 1 microsecond are readily achievable with a 1% precision by the use of circuits described above.

From the foregoing description, it can be appreciated that my invention makes available an improved gamma camera which has a fast response time due to the use of one, or at the most two, phosphor conversion stages. The fast response and improved image quality obtained with my gamma camera results from the location of the semiconductor position sensor within the image intensifier tube so that high energy pulsed electron excitation thereof is utilized for obtaining quantum gain.

Having described a number of specific embodiments of my fast response time, image tube camera apparatus, it is believed that modification and variation of my invention are possible in light of the above teachings. Thus, other materials may be utilized in the semiconductor position sensor both for forming the semiconductor body and contact layers therein. Also, other type electronic circuitry can be employed in the electronic calculating circuit 18 to obtain the x and y coordinates of the impacting electrons. Finally, although my electronic calculating circuit utilizes only a single energy analyzer 47 in the intensity channel input to the cathode ray tube, it should be evident that a multichannel energy analyzer could readily be used in order to monitor or detect impacting electron pulses having wide ranges of energy levels. It is, therefore, to be understood that changes may be made in the particular embodiments of my invention as described which are within the full intended scope of the invention as defined by the following claims.

What I claim as new and desire to secure by Letters Patent of the United States is:

1. An improved, fast response time, image-tube camera apparatus comprising
    a sealed evacuated housing having input and output ends,
    a first phosphor layer formed along a surface of the input end of said housing,
    a first photocathode film in optical communication with said first phosphor layer and disposed inside said housing adjacent and along the input end thereof, said first phosphor layer producing a pulse of light in response to an absorbed incident nuclear particle or ray of electromagnetic radiation generated external of said housing, the number of optical photons in each light pulse being proportional to the energy of the absorbed incident ray or particle, said photocathode film detecting the optical photons and emitting electrons in response thereto,
    a second phosphor layer disposed inside said housing between said first photocathode film and the output end of said housing and positioned generally normal to the paths of the electrons emitted by said first photocathode film and beyond the cross-over point thereof,
    a second photocathode film in optical communication with said second phosphor layer and disposed inside said housing between said second phosphor layer and the output end of said housing so that the apparatus comprises a dual-stage image intensifier,
    semiconductor dual-axis position sensor means positioned within said housing adjacent the output end thereof for detecting electrons emitted from the second photocathode film and producing electrical signals from which the dual-axis coordinates of the second photocathode-emitted electrons impacting on said semiconductor means and the corresponding incident ray or particle can be determined, the number of impacting electrons being derivable from the output of said semiconductor means and being proportional to the energy of the incident ray or particle, and,
    means for accelerating the electrons emitted from said second photocathode film and for focussing them on said semiconductor means to cause high energy pulsed electron excitation thereof so as to provide a substantial quantum gain over the conventional low energy light photon excitation thereof and so obtain improved image quality and faster response time thereover.

2. The image-tube camera apparatus set forth in claim 1 wherein
    said second photocathode film is in close proximity to said semiconductor means so that electrons emitted from said second photocathode film are proximity focussed on said semiconductor means.

3. The image-tube camera apparatus set forth in claim 1 wherein
   said second photocathode film is substantially spaced from said semiconductor means,
   and further comprising
   means for accelerating and focussing electrons emitted from said second photocathode film onto said semiconductor means by cross-over of the electron paths.

4. The image-tube camera apparatus set forth in claim 1 wherein
   said first phosphor layer is formed along an outer surface of an input window at the input end of a first glass envelope forming said housing,
   said second phosphor layer is formed along an inner surface of an output window at the output end of said first glass envelope,
   said second photocathode film is formed along an inner surface of an input window at the input end of a second glass envelope forming said housing,
   optical fiber means for interconnecting the output of said second phosphor layer with said second photocathode film, and
   said semiconductor position sensor means positioned within said second glass envelope adjacent the output end thereof.

5. The image-tube camera apparatus set forth in claim 1 wherein
   said first phosphor layer is fabricated of a material selected from the class consisting of thallium-activated sodium iodide, thallium-activated cesium iodide and sodium-activated cesium iodide, and
   said second phosphor layer has a fast response and is fabricated of zinc oxide.

6. The image-tube camera apparatus set forth in claim 1 and further comprising
   means positioned between a source of the incident nuclear particle or ray of electromagnetic radiation located external of said housing and said first phosphor layer for collimating the particles or radiation.

7. The image-tube camera apparatus set forth in claim 1 wherein
   said semiconductor dual-axis position sensor means comprises
   a body of lightly doped semiconductor material of a first conductivity type,
   a heavily doped, thin first semiconductor layer of a second conductivity type opposite of the first type formed along a first surface of said body of semiconductor material on which the photocathode-emitted electrons impact,
   a heavily doped, thin second semiconductor layer of the first conductivity type formed along a second surface of said body of semiconductor material opposite the first surface,
   a first pair of electrically conductive terminal strips connected to the first surface of said body of semiconductor material along two opposite edges thereof,
   a second pair of electrically conductive terminal strips connected to the second surface of said body of semiconductor material along the two opposite edges thereof rotated 90° with respect to the two edges on the first surface, and
   means connected to one of each of said first and second pair of terminal strips for reverse-biasing said body of semiconductor material so as to produce a depletion region therein.

8. The image-tube camera apparatus set forth in claim 7 wherein said electronic circuit means comprises
   a first charge-sensitive amplifier having an input connected to a first of the first pair of terminal strips,
   a second charge-sensitive amplifier having an input connected to a second of said first pair of terminal strips,
   a third charge-sensitive amplifier having an input connected to a first of said second pair of terminal strips.

9. An improved, fast response time, image-tube camera apparatus comprising
   a sealed evacuated housing having input and output ends,
   a first phosphor layer formed along a surface of the input end of said housing,
   a first photocathode film in optical communication with said first phosphor layer and disposed inside said housing adjacent and along the input end thereof, said first phosphor layer producing a pulse of light in response to an absorbed incident nuclear particle or ray of electromagnetic radiation generated external of said housing, the number of optical photons in each light pulse being proportional to the energy of the absorbed incident ray or particle, said photocathode film detecting the optical photons and emitting electrons in response thereto,
   semiconductor dual-axis position sensor means positioned within said housing adjacent the output end thereof for detecting the electrons and producing electrical signals from which the dual-axis coordinates of the photocathode-emitted electrons impacting on said semiconductor means and the corresponding incident ray or particle can be determined, the number of impacting electrons being derivable from the output of said semiconductor means and being proportional to the energy of the incident ray or particle,
   said semiconductor dual-axis position sensor means comprises
   a body of lightly doped semiconductor material of a first conductivity type,
   a heavily doped, thin first semiconductor layer of a second conductivity type opposite of the first type formed along a first surface of said body of semiconductor material on which the photocathode-emitted electrons impact,
   a heavily doped, thin second semiconductor layer of the first conductivity type formed along a second surface of said body of semiconductor material opposite the first surface,
   a first pair of electrically conductive terminal strips connected to the first surface of said body of semiconductor material along two opposite edges thereof,
   a second pair of electrically conductive terminal strips connected to the second surface of said body of semiconductor material along the two opposite edges thereof rotated 90° with respect to the two edges on the first surface, and
   means connected to one of each of said first and second pair of terminal strips for reverse-biasing said body of semiconductor material so as to produce a depletion region therein, means for accelerating the electrons emitted from said first photocathode film and for focussing them on said semiconductor means to cause high energy pulsed electron excitation thereof so as to provide a substantial quantum gain over the conventional low energy light photon excitation thereof and so obtain improved image quality and faster response time thereover, and electronic circuit means external of said housing and having inputs connected to outputs of said semiconductor means for producing a pair of electrical signals representing the dual-axis coordinates of the incident ray or particle and a third signal corresponding to the energy thereof, said electronic circuit means comprises a first charge-sensitive amplifier having an input connected to a first of the first pair of terminal strips, a second charge-sensitive amplifier having an input connected to a second of said first pair of terminal strips, a third charge-sensitive amplifier having an input connected to a first of said second pair of terminal strips, a first circuit for summing the outputs of said first and second charge-sensitive amplifiers, a second circuit for dividing the output of said second charge-sensitive amplifier by the sum of the output of said first and second charge-sensitive amplifiers, and a third circuit for dividing the output of said third charge-sensitive amplifier by the sum of the outputs of said first and second charge-sensitive amplifiers wherein the output of the first circuit is proportional to the total number of electrons impacting on said semiconductor position sensor means and therefore is proportional to the energy of the incident ray or particle, the output of the second circuit represents the x-coordinate of the impacting electrons and therefore also the x-coordinate of the incident ray or particle, and the output of the third circuit represents the y-coordinate of the impacting electrons and therefore also the y-coordinate of the incident ray or particle.

10. The image-tube camera apparatus set forth in claim 9 wherein an output from said electronic circuit means being connected to a cathode ray tube read out means for recording the $x$ and $y$ coordinates of the incident ray or particle.

11. The image-tube camera apparatus set forth in claim 9 wherein an output from said electronic circuit means being connected to a digital recording readout means for recording the $x$ and $y$ coordinates of the incident ray or particle.

12. The image-tube camera appparatus set forth in claim 9 wherein an output from said electronic circuit means is connected to a read-out means for storing the $x$ and $y$ coordinate and energy information for later read-out on photographic film.

13. The image-tube camera apparatus set forth in claim 9 and further comprising channel electron multiplier means positioned in said housing between said first photocathode film and said semiconductor means and in close proximity to said semiconductor means for increasing the number of electrons impacting on said semiconductor means so as to obtain improved image quality.

14. The image-tube camera apparatus set forth in claim 9 and further comprising electrode means positioned in said sealed housing intermediate said first photocathode film and said semiconductor sensor means for obtaining variable magnification imaging so that the camera apparatus is zoomable.

* * * * *